United States Patent
Eremita et al.

(10) Patent No.: US 7,539,326 B2
(45) Date of Patent: May 26, 2009

(54) METHOD FOR VERIFYING AN INTENDED ADDRESS BY OCR PERCENTAGE ADDRESS MATCHING

(75) Inventors: Joseph Eremita, Hamden, CT (US); Adrian Ruck, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 670 days.

(21) Appl. No.: 11/318,230

(22) Filed: Dec. 23, 2005

(65) Prior Publication Data

US 2007/0147659 A1    Jun. 28, 2007

(51) Int. Cl.
*G06K 9/00* (2006.01)

(52) U.S. Cl. .......................... 382/101; 707/200; 707/3; 707/6; 235/492; 209/584; 382/137; 382/229; 382/230; 382/181; 382/225; 382/197; 382/203; 382/184; 382/174; 382/175

(58) Field of Classification Search ............... 382/101, 382/161, 225, 226, 228, 230, 231, 311, 197, 382/203, 184, 174, 175, 190; 707/3, 6, 200; 705/30, 401; 235/492; 209/584

See application file for complete search history.

(56) References Cited

U.S. PATENT DOCUMENTS

| | | | |
|---|---|---|---|
| 6,115,707 A * | 9/2000 | Shimomura | 707/6 |
| 6,741,724 B1 * | 5/2004 | Bruce et al. | 382/101 |
| 6,796,433 B2 * | 9/2004 | Daniels et al. | 209/384 |
| 7,003,376 B2 * | 2/2006 | Witmond et al. | 700/225 |
| 7,031,519 B2 * | 4/2006 | Elmenhurst | 382/181 |
| 7,181,045 B2 * | 2/2007 | Vollmann | 382/101 |
| 7,415,131 B2 * | 8/2008 | Mampe et al. | 382/101 |
| 7,415,171 B2 * | 8/2008 | Snapp | 382/311 |
| 2006/0104498 A1 * | 5/2006 | Kruppa et al. | 382/139 |
| 2006/0215937 A1 * | 9/2006 | Snapp | 382/311 |

* cited by examiner

*Primary Examiner*—Vikkram Bali
*Assistant Examiner*—Nancy Bitar
(74) *Attorney, Agent, or Firm*—Michael J. Cummings; Steven J. Shapiro; Angelo N. Chaclas

(57) ABSTRACT

An OCR percentage matching algorithm achieves a significant reduction in false mismatches accounting for combinations of unprocessed spaces, missing characters, extra characters and character substitution errors during the OCR scanning processing and allows for a specified percentage of the OCR character scan rather the entire OCR character scan to be the same as the expected character string to declare a match.

8 Claims, 16 Drawing Sheets

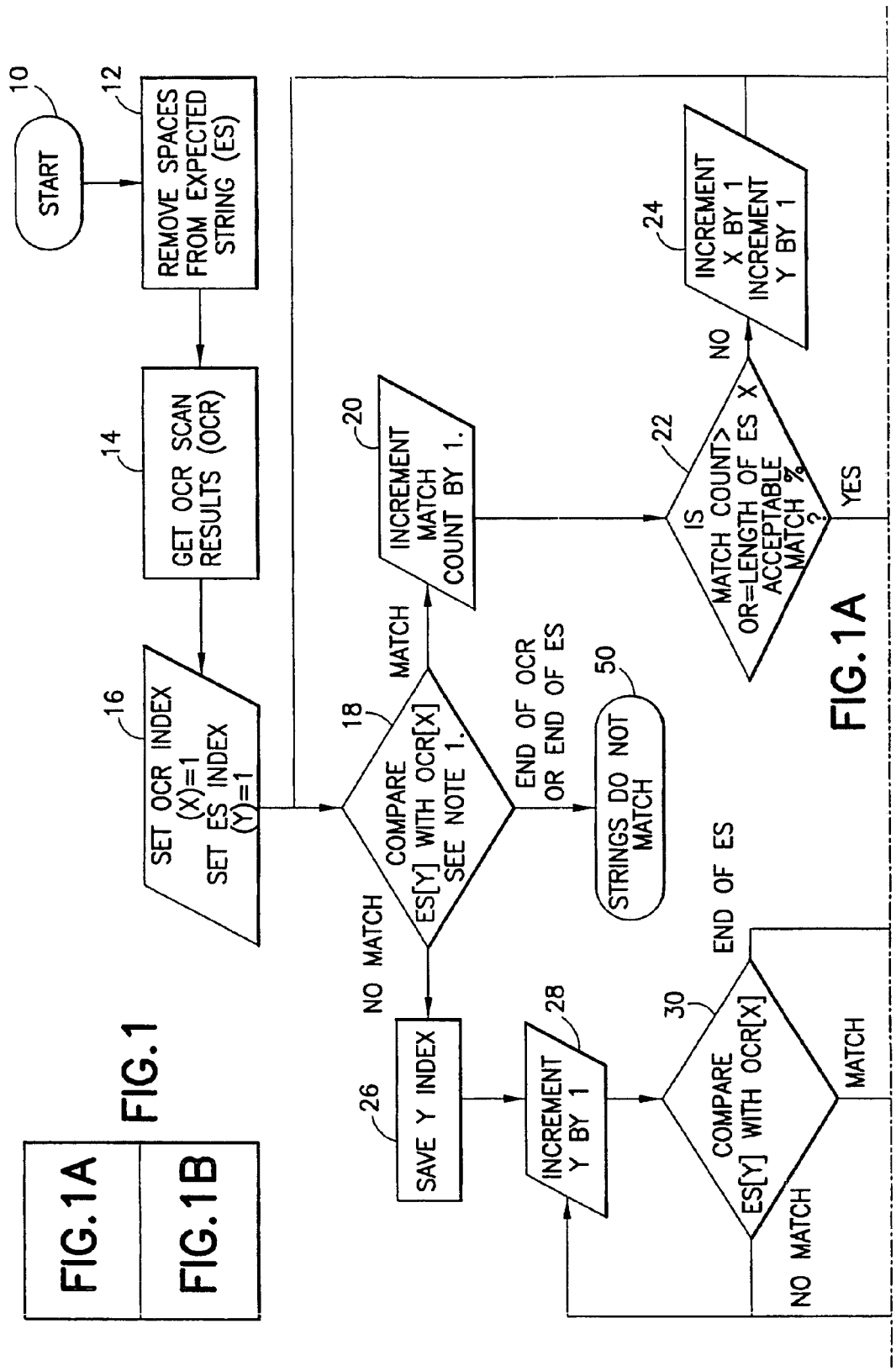

OCR SCAN: MRJOSPHRMITA

EXPECTED: MR JOSEPH EREMITA

FIG. 2

OCR SCAN: MRxJOSEPHxEREMITA

EXPECTED: MR JOSEPH EREMITA

FIG. 4

OCR SCAN: MRJ?8EPHEREMIT?

EXPECTED: MR JOSEPH EREMITA

FIG. 6

OCR SCAN: MRJOSL2PHL2RL2M11A

EXPECTED: MR JOSEPH EREMITA

| FIG. 3A |
|---|
| FIG. 3B |

FIG. 3

| Method Step | Operation | Result |
|---|---|---|
| 10 | Start | |
| 12 | MRJOSEPHEREMITA | |
| | y-index 1(M)2(R)3(J)4(O)5(S)6(E)7(P)8(H)9(E)10(R) 11(E)12(M)13(I)14(T)15(A) | |
| 14 | MRJOSPHRMITA | |
| | x-index 1(M)2(R)3(J)4(O)5(S)6(P)7(H)8(R)9(M)10(I) 11(T)12(A) | |
| 16 | x = 1, y = 1 | |
| 18 | compare ES(1)"M" with OCR(1) "M" | match |
| 20 | MC+1=1 | |
| 22 | MC<12 | |
| 24 | x+1=2, y+1=2 | |
| 18 | compare ES(2) "R" with OCR(2) "R" | match |
| 20 | MC+1=2 | |
| 22 | MC<12 | |
| 24 | x+1=3, y+1=3 | |
| 18 | compare ES(3) "J" with OCR(3) "J" | match |
| 20 | MC+1=3 | |
| 22 | MC<12 | |
| 24 | x+1=4, y+1=4 | |
| 18 | compare ES(4)"O" with OCR(4) "O" | match |
| 20 | MC+1=4 | |
| 22 | MC<12 | |
| 24 | x+1=5, y+1=5 | |
| 18 | compare ES(5)"S" with OCR(5) "S" | match |
| 20 | MC+1=5 | |
| 22 | MC<12 | |
| 24 | x+1=6, y+1=6 | |
| 18 | compare ES(6)"E" with OCR(6) "E" | match |
| 26 | save y = 6 | |
| 28 | y+1 = 7 | |
| 30 | compare ES(7)"P" with OCR(6) "P" | match |
| 32 | single match = true | |
| 34 | look ahead, compare ES(8) "H" with OCR (7) "H" | match |
| 36 | increment x, y, MC by 2 | |
| | x+2=6+2=8, y+2=7+2=9, MC+2=7 | |
| 46 | MC<12 | |
| 18 | compare ES(9)"E" with OCR(8) "R" | no match |
| 26 | save y = 9 | |
| 28 | y+1 = 10 | |
| 30 | compare ES(10)"R" with OCR(8) "R" | match |

FIG.3A

| | | |
|---|---|---|
| 32 | single match = true | |
| 34 | look ahead, compare ES(11) "E" with OCR (9) "M" | no match |
| 28 | y+1 = 11 | |
| 30 | compare ES(11)"E" with OCR(8) "R" | no match |
| 28 | y+1 = 12 | |
| 30 | compare ES(12)"M" with OCR(8) "R" | no match |
| 28 | y+1 = 13 | |
| 30 | compare ES(13)"I" with OCR(8) "R" | no match |
| 28 | y+1 = 14 | |
| 30 | compare ES(14)"T" with OCR(8) "R" | no match |
| 28 | y+1 = 15 | |
| 30 | compare ES(15)"A" with OCR(8) "R" | no match |
| 40 | single match ES(10) "R" with OCR (8) "R" | |
| 42 | y=10, x=8, set single match false | |
| 18 | compare ES(10) "R" with OCR(8) "R" | match |
| 20 | MC+1=8 | |
| 22 | MC<12 | |
| 24 | x+1=9, y+1=11 | |
| 18 | compare ES(11) "E" with OCR(9) "M" | no match |
| 26 | save y=12 | |
| 28 | y+1=12 | |
| 30 | compare ES(12) "M" with OCR(9) "M" | match |
| 32 | single match = true | |
| 34 | look ahead, compare ES(13) "I" with OCR (10) "I" | match |
| 36 | increment x, y, MC by 2 | |
| 46 | MC<12 | |
| 18 | compare ES(14) "T" with OCR(11) "T" | match |
| 20 | MC+1=11 | |
| 22 | MC<12 | |
| 24 | x+1=12, y+1=15 | |
| 18 | compare ES(15) "A" with OCR(11) "A" | match |
| 20 | MC+1=12 | |
| 22 | MC=12 | |
| 48 | strings match | |

| Method Step | Operation | Result |
|---|---|---|
| 10 | Start | |
| 12 | MRJOSEPHEREMITA | |
| | y-index 1(M)2(R)3(J)4(O)5(S)6(E)7(P)8(H)9(E)10(R)11(E)12(M)13(I)14(T)15(A) | |
| 14 | MRxJOSEPHxEREMITA | |
| | x-index 1(M)2(R)3(x)4(J)5(O)6(S)7(E)8(P)9(H)10(X)11(E)12(R)13(E)14(M)15(I)16(T)17(A) | |
| 16 | x = 1, y = 1 | |
| 18 | compare ES(1)"M" with OCR(1) "M" | match |
| 20 | MC+1=1 | |
| 22 | MC<15 | |
| 24 | x+1=2, y+1=2 | |
| 18 | compare ES(2) "R" with OCR(2) "R" | match |
| 20 | MC+1=2 | |
| 22 | MC<15 | |
| 24 | x+1=3, y+1=3 | |
| 18 | compare ES(3) "J" with OCR(3) "x" | no match |
| 26 | save y = 3 | |
| 28 | y+1=4 | |
| 30 | compare ES(4) "O" with OCR(3) "x" | no match |
| 28 | y+1=5 | |
| 30 | compare ES(5) "S" with OCR(3) "x" | no match |
| 28 | y+1=6 | |
| 30 | compare ES(6) "E" with OCR(3) "x" | no match |
| 28 | y+1=7 | |
| 30 | compare ES(7) "P" with OCR(3) "x" | no match |
| 28 | y+1=8 | |
| 30 | compare ES(8)"H" with OCR(3) "x" | no match |

FIG. 5A

| 28 | y+1=9 | |
|---|---|---|
| 30 | compare ES(9) "E" with OCR(3) "x" | no match |
| 28 | y+1=10 | |
| 30 | compare ES(10) "R" with OCR(3) "x" | no match |
| 28 | y+1=11 | |
| 30 | compare ES(11) "E" with OCR(3) "x" | no match |
| 28 | y+1=12 | |
| 30 | compare ES(12) "M" with OCR(3) "x" | no match |
| 28 | y+1=13 | |
| 30 | compare ES(13) "I" with OCR(3) "x" | no match |
| 28 | y+1=14 | |
| 30 | compare ES(14) "T" with OCR(3) "x" | no match |
| 28 | y+1=15 | |
| 30 | compare ES(15)"A" with OCR(3) "x" | EOES |
| 40 | no single match | |
| 44 | y=3 x+1=4 | |
| 18 | compare ES(3)"J" with OCR(5) "O" | match |
| 20 | MC+1=3 | |
| 22 | MC<15 | |
| 24 | x+1=5, y+1=4 | |
| 18 | compare ES(4)"O" with OCR(5) "O" | match |
| 20 | MC+1=4 | |
| 22 | MC<15 | |
| 24 | x+1=6, y+1=5 | |
| 18 | compare ES(5)"S" with OCR(6) "S" | match |
| 20 | MC+1=5 | |
| 22 | MC<15 | |
| 24 | x+1=7, y+1=6 | |
| 18 | compare ES(6)"E" with OCR(7) "E" | match |
| 20 | MC+1=6 | |
| 22 | MC<15 | |
| 24 | x+1=8, y+1=7 | |
| 18 | compare ES(7)"P" with OCR(8) "P" | match |
| 20 | MC+1=7 | |
| 22 | MC<15 | |
| 24 | x+1=9, y+1=8 | |
| 18 | compare ES(8)"H" with OCR(9) "H" | match |
| 20 | MC+1=8 | |
| 22 | MC<15 | |
| 24 | x+1=10, y+1=9 | |
| 18 | compare ES(9)"E" with OCR(10) "x" | no match |

FIG. 5B

| | | |
|---|---|---|
| 26 | save y = 9 | |
| 28 | y+1=10 | |
| 30 | compare ES(10) "R" with OCR (10) "x" | no match |
| 28 | y+1=11 | |
| 30 | compare ES(11) "E" with OCR(10) "x" | no match |
| 28 | y+1=12 | |
| 30 | compare ES(12) "M" with OCR(10) "x" | no match |
| 28 | y+1=13 | |
| 30 | compare ES(13) "I" with OCR(10) "x" | no match |
| 28 | y+1=14 | |
| 30 | compare ES(14) "T" with OCR(10) "x" | no match |
| 28 | y+1=15 | |
| 30 | compare ES(15) "A" with OCR(10) "x" | EOES |
| 40 | no single match | |
| 44 | y=9, x+1=11 | |
| 18 | compare ES(9) "E" with OCR(11) "E" | match |
| 20 | MC+1=9 | |
| 22 | MC<15 | |
| 24 | x+1=12, y+1=10 | |
| 18 | compare ES(10) "R" with OCR(12) "R" | match |
| 20 | MC+1=10 | |
| 22 | MC<15 | |
| 24 | x+1=13, y+1=11 | |
| 18 | compare ES(11) "E" with OCR(13) "E" | match |
| 20 | MC+1=10 | |
| 22 | MC<15 | |
| 24 | x+1=14 y+1=12 | |
| 18 | compare ES(12) "M" with OCR(14) "M" | match |
| 20 | MC+1=12 | |
| 22 | MC<15 | |
| 24 | x+1=15, y+1=13 | |
| 18 | compare ES(13) "I" with OCR(15) "I" | match |
| 20 | MC+1=13 | |
| 22 | MC<15 | |
| 24 | x+1=16, y+1=14 | |
| 18 | compare ES(14) "T" with OCR(16) "T" | match |
| 20 | MC+1=14 | |
| 22 | MC<15 | |
| 24 | x+1=17, y+1=15 | |
| 18 | compare ES(15) "A" with OCR(17) "A" | match |
| 20 | MC+1=15 | |
| 22 | MC=ES | 100% match |
| 44 | strings match | |

| Method Step | Operation | Result |
|---|---|---|
| 10 | Start | |
| 12 | MRJOSEPHEREMITA | |
|  | y-index 1(M)2(R)3(J)4(O)5(S)6(E)7(P)8(H)9(E)10(R)11(E)12(M)13(I)14(T)15(A) | |
| 14 | MRJ?8EPHEREMIT? | |
|  | x-index 1(M)2(R)3(J)4(?)5(8)6(E)7(P)8(H)9(E)10(R)11(E)12(M)13(I)14(T)15(?) | |
| 16 | x = 1, y = 1 | |
| 18 | compare ES(1)"M" with OCR(1) "M" | match |
| 20 | MC+1=1 | |
| 22 | MC<12 | |
| 24 | x+1=2 y+1=2 | |
| 18 | compare ES(2) "R" with OCR(2) "R" | match |
| 20 | MC+1=2 | |
| 22 | MC<12 | |
| 24 | x+1=3 y+1=3 | |
| 18 | compare ES(3) "J" with OCR(3) "J" | match |
| 20 | MC+1=3 | |
| 22 | MC<12 | |
| 24 | x+1=4, y+1=4 | |
| 18 | compare ES(4) "O" with OCR(4) "?" | no match |
| 26 | save y=4 | |
| 28 | y+1=5 | |
| 30 | compare ES(5) "S" with OCR (4) "?" | no match |
| 28 | y+1=6 | |
| 30 | compare ES(6) "E" with OCR (4) "?" | no match |
| 28 | y+1=7 | |
| 30 | compare ES(7) "P" with OCR (4) "?" | no match |
| 28 | y+1=8 | |
| 30 | compare ES(8) "H" with OCR (4) "?" | no match |
| 28 | y+1=9 | |

FIG. 7A

| | | |
|---|---|---|
| 30 | compare ES(9) "E" with OCR (4) "?" | no match |
| 28 | y+1=10 | |
| 30 | compare ES(10) "R" with OCR (4) "?" | no match |
| 28 | y+1=11 | |
| 30 | compare ES(11) "E" with OCR (4) "?" | no match |
| 28 | y+1=12 | |
| 30 | compare ES(12) "M" with OCR (4) "?" | no match |
| 28 | y+1=13 | |
| 30 | compare ES(13) "I" with OCR (4) "?" | no match |
| 28 | y+1=14 | |
| 30 | compare ES(14) "T" with OCR (4) "?" | no match |
| 28 | y+1=15 | |
| 30 | compare ES(15)"A" with OCR(4) "?" | EOES |
| 40 | single match not true | |
| 44 | y=4, x+1=5 | |
| 18 | compare ES(4)"O" with OCR(5) "8" | no match |
| 18 | y+1=5 | |
| 30 | compare ES(5)"S" with OCR(5) "8" | no match |
| 28 | y+1=6 | |
| 30 | compare ES(6)"E" with OCR(5) "8" | no match |
| 28 | y+1=7 | |
| 30 | compare ES(7)"P" with OCR(5) "8" | no match |
| 28 | y+1=8 | |
| 30 | compare ES(8)"H" with OCR(5) "8" | no match |
| 28 | y+1=9 | |
| 30 | compare ES(9)"E" with OCR(5) "8" | no match |
| 28 | y+1=10 | |
| 30 | compare ES(10)"R" with OCR(5) "8" | no match |
| 28 | y+1=11 | |
| 30 | compare ES(11)"E" with OCR(5) "8" | no match |
| 28 | y+1=12 | |
| 30 | compare ES(12)"M" with OCR(5) "8" | no match |
| 28 | y+1=13 | |
| 30 | compare ES(13)"I" with OCR(5) "8" | no match |
| 28 | y+1=14 | |
| 30 | compare ES(14)"T" with OCR(5) "8" | no match |
| 28 | y+1=15 | |
| 30 | compare ES(15)"A" with OCR(5) "8" | EOES |
| 40 | single match not true | |
| 44 | y=4, x+1=6 | |

FIG. 7B

| 18 | compare ES(4)"O" with OCR(6) "E" | no match |
|---|---|---|
| 26 | save y=4 | |
| 28 | y+1=5 | |
| 30 | compare ES(5)"S" with OCR(6) "E" | no match |
| 28 | y+1=6 | |
| 30 | compare ES(6)"E" with OCR(6) "E" | match |
| 32 | single match equal true | |
| 34 | look ahead, compare ES(7) "P" with OCR (7) "P" | match |
| 36 | increment x, y, MC by 2 | |
| | x+2=8, y+2=8, MC+2=5 | |
| 46 | MC<12 | |
| 18 | compare ES(8)"H" with OCR(8) "H" | match |
| 20 | MC+1=6 | |
| 22 | MC<12 | |
| 24 | x+1=9, y+1=9 | |
| 18 | compare ES(9)"E" with OCR(9) "E" | match |
| 20 | MC+1=7 | |
| 22 | MC<12 | |
| 24 | x+1=10, y+1=10 | |
| 18 | compare ES(10)"R" with OCR(10) "R" | match |
| 20 | MC+1=8 | |
| 22 | MC<12 | |
| 24 | x+1=11, y+1=11 | |
| 18 | compare ES(11)"E" with OCR(11) "E" | match |
| 20 | MC+1=9 | |
| 22 | MC<12 | |
| 24 | x+1=12, y+1=12 | |
| 18 | compare ES(12)"M" with OCR(12) "M" | match |
| 20 | MC+1=10 | |
| 22 | MC<12 | |
| 24 | x+1=13, y+1=13 | |
| 18 | compare ES(13)"I" with OCR(13) "I" | match |
| 20 | MC+1=11 | |
| 22 | MC<12 | |
| 24 | x+1=14, y+1=14 | |
| 18 | compare ES(14)"T" with OCR(14) "T" | match |
| 20 | MC+1=12 | |
| 22 | MC=12 acceptable match % | % match met |
| 48 | strings match | |

| Method Step | Operation | Result |
|---|---|---|
| 10 | Start | |
| 12 | MRJOSEPHEREMITA | |
| | y-index 1(M)2(R)3(J)4(O)5(S)6(E)7(P)8(H)9(E)10(R) 11(E)12(M)13(I)14(T)15(A) | |
| 14 | MRJOSL2PHL2RL2M11A | |
| | x-index 1(M)2(R)3(J)4(O)5(S)6(L2) 7(P)8(H)9(L2) 10(R)11(L2)12(M)13(1)14(1)15(A) | |
| 16 | x = 1, y = 1 | |
| 18 | compare ES(1)"M" with OCR(1) "M" | match |
| 20 | MC+1=1 | |
| 22 | MC<ES match % | |
| 24 | x+1=2, y+1=2 | |
| 18 | compare ES(2) "R" with OCR(2) "R" | match |
| 20 | MC+1=2 | |
| 22 | MC<ES match % | |
| 24 | x+1=3, y+1=3 | |
| 18 | compare ES(3) "J" with OCR(3) "J" | match |
| 20 | MC+1=3 | |
| 22 | MC<ES match % | |
| 24 | x+1=4, y+1=4 | |
| 18 | compare ES(4) "O" with OCR(4) "O" | match |
| 20 | MC+1=4 | |
| 22 | MC<ES match % | |
| 24 | x+1=5, y+1=5 | |
| 18 | compare ES(5) "S" with OCR (5) "S" | match |
| 20 | MC+1=5 | |
| 22 | MC<ES match % | |
| 24 | x+1=6, y+1=6 | |
| 18 | compare ES(6) "E" with OCR (6) "L2" | no match |
| 26 | save y=6 | |

FIG. 9A

| | | |
|---|---|---|
| 28 | y+1=7 | |
| 30 | compare ES(7) "P" with OCR (6) "L2" | no match |
| 28 | y+1=8 | |
| 30 | compare ES(8) "H" with OCR (6) "L2" | no match |
| 28 | y+1=9 | |
| 30 | compare ES(9) "E" with OCR (6) "L2" | no match |
| 28 | y+1=10 | |
| 30 | compare ES(10) "R" with OCR (6) "L2" | no match |
| 28 | y+1=11 | |
| 30 | compare ES(11) "E" with OCR (6) "L2" | no match |
| 28 | y+1=12 | |
| 30 | compare ES(12) "M" with OCR (6) "L2" | no match |
| 28 | y+1=13 | |
| 30 | compare ES(13) "I" with OCR (6) "L2" | no match |
| 28 | y+1=14 | |
| 30 | compare ES(14) "T" with OCR (6) "L2" | no match |
| 28 | y+1=15 | |
| 30 | compare ES(15)"A" with OCR(6) "L2" | no match EOES |
| 40 | single match not true | |
| 44 | y=6, x+1=7 | |
| 18 | compare ES(6)"E" with OCR(7) "P" | no match |
| 26 | save y=6 | |
| 28 | y+1=7 | |
| 30 | compare ES(7) "P" with OCR (7) "P" | match |
| 32 | look ahead, compare ES(8) "H" with OCR (8) "H" | match |
| 36 | increment x, y, MC by 2 | |
| | x+2=9, y+2=9, MC+2=7 | |
| 46 | MC<ES % match | |
| 18 | compare ES(9)"E" with OCR(9) "L2" | no match |
| 26 | save y=9 | |
| 28 | y+1=10 | |
| 30 | compare ES(10) "R" with OCR (9) "L2" | no match |
| 28 | y+1=11 | |
| 30 | compare ES(11) "E" with OCR (9) "L2" | no match |
| 28 | y+1=12 | |
| 30 | compare ES(12) "M" with OCR (9) "L2" | no match |
| 28 | y+1=13 | |
| 30 | compare ES(13) "I" with OCR (9) "L2" | no match |
| 28 | y+1=14 | |
| 30 | compare ES(14) "T" with OCR (9) "L2" | no match |
| 28 | y+1=15 | |

FIG. 9B

| | | |
|---|---|---|
| 44 | y=9, x+1=10 | |
| 18 | compare ES(9)"E" with OCR(10) "R" | no match |
| 26 | save y=9 | |
| 28 | y+1=10 | |
| 30 | compare ES(10)"R" with OCR(10) "R" | match |
| 32 | single match equal true | |
| 34 | look ahead, compare ES(11) "E" with OCR (11) "L2" | no match |
| 28 | y+1=12 | |
| 30 | compare ES(12)"M" with OCR(11) "L2" | no match |
| 28 | y+1=13 | |
| 30 | compare ES(13)"I" with OCR(11) "L2" | no match |
| 28 | y+1=14 | |
| 30 | compare ES(14)"T" with OCR(11) "L2" | no match |
| 28 | y+1=15 | |
| 30 | compare ES(15)"A" with OCR(11) "L2" | no match EOES |
| 40 | single match true | |
| 42 | y=10, x=10, set single match false | |
| 18 | compare ES(10)"R" with OCR(10) "R" | match |
| 20 | MC+1=8 | |
| 22 | MC<ES match % | |
| 24 | x+1=11, y+1=11 | |
| 18 | compare ES(11)"E" with OCR(11) "L2" | no match |
| 26 | save y=11 | |
| 28 | y+1=12 | |
| 30 | compare ES(12)"M" with OCR(11) "L2" | no match |
| 28 | y+1=13 | |
| 30 | compare ES(13)"I" with OCR(11) "L2" | no match |
| 28 | y+1=14 | |
| 30 | compare ES(14)"T" with OCR(11) "L2" | no match |
| 28 | y+1=15 | |
| 30 | compare ES(15)"A" with OCR(11) "L2" | no match EOES |
| 40 | single match not true | |
| 44 | y=11, x+1=12 | |
| 18 | compare ES(11)"E" with OCR(12) "M" | no match |
| 26 | save y=11 | |
| 28 | y+1=12 | |
| 30 | compare ES (12) "M" with OCR(12) "M" | match |
| 32 | single match equal true | |
| 34 | look ahead, compare ES(13) "I" with OCR (13)"I" | no match |
| 28 | y+1=14 | |

FIG. 9C

| 42 | y=12, x=12, set match false | |
|---|---|---|
| 18 | compare ES(12)"M" with OCR(12) "M" | match |
| 20 | MC+1=9 | |
| 22 | MC<match % ES | |
| 24 | x+1=13, y+1=13 | |
| 18 | compare ES(13)"I" with OCR(13) "1" | no match |
| 26 | save y=13 | |
| 28 | y+1=14 | |
| 30 | compare ES (14) "T" with OCR(13) "1" | no match |
| 28 | y+1=15 | |
| 30 | compare ES (15) "A" with OCR(13) "1" | no match |
| 40 | single match not true | |
| 44 | y=13, x+1=14 | |
| 18 | compare ES(13)"I" with OCR(14) "1" | no match |
| 26 | save y=13 | |
| 28 | y+1=14 | |
| 30 | compare ES(14)"T" with OCR(14) "1" | no match |
| 28 | y+1=15 | |
| 30 | compare ES(15)"A" with OCR(14) "1" | no match EOES |
| 40 | single match not true | |
| 44 | y=13, x+1=15 | |
| 18 | compare ES(13)"I" with OCR(15) "A" | no match |
| 26 | save y=13 | |
| 28 | y+1=14 | |
| 30 | compare ES(14)"T" with OCR(15) "A" | no match |
| 28 | y+1=15 | |
| 30 | compare ES(15)"A" with OCR(15) "A" | EOES match |
| 40 | single match equal true | |
| 42 | y=15, x=15, set match false | |
| 18 | compare ES(15)"A" with OCR(15) "A" | match |
| 20 | MC+1=10 | |
| 22 | MC= match % ES | % match met |
| 48 | strings match | |

FIG. 9D

METHOD FOR VERIFYING AN INTENDED ADDRESS BY OCR PERCENTAGE ADDRESS MATCHING

TECHNICAL FIELD

The present invention relates generally to address matching on mailpieces and deals more particularly with a method for verifying that an intended addressee on a mailpiece matches a valid addressee when the percentage of characters of an OCR character string scan of the intended addressee match a predetermined threshold percentage of the characters of an expected character string of the corresponding valid addressee.

BACKGROUND OF THE INVENTION

The processing and handling of mailpieces consumes an enormous amount of human and financial resources, particularly if the processing of the mailpieces is done manually. The processing and handling of mailpieces not only takes place at the Postal Service, but also occurs at each and every business or other site where communication via the mail delivery system is utilized. That is, various pieces of mail generated by a plurality of departments and individuals within a company need to be addressed, collected, sorted and franked as part of the outgoing mail process. Additionally, incoming mail needs to be collected and sorted efficiently to ensure that it gets to the addressee (i.e. employee or department) in a minimal amount of time. Since much of the documentation and information being conveyed through the mail system is critical in nature relative to the success of business, it is imperative that the processing and handling of both the incoming and outgoing mailpieces be done efficiently and reliably so as not to negatively impact the functioning of the business.

It is known to use Optical Character Recognition (OCR) scanning for name and address matching on a mail processing apparatus to verify that a valid address is visible on the envelope and that this scanned name and address matches an expected value, to verify mailpiece completion by comparing the OCR read information to an addressee database in order to determine the appropriate destination points for delivery of the mailpieces. However, OCR scanning and processing on mailpieces is generally error prone due to missing characters, substitution, untrained characters and poor imaging among other causes.

Missing character errors are mainly caused by a failure to separate characters. Extra character errors can be caused by improper separation, speckles in white space, untrained characters, or a change in font. Substitution errors can be the result of untrained characters (usually substituted with '?'), poorly trained characters, or change in font. Any of these processing errors can also be caused by poor image conditions such as poor focus, lighting, or contrast or bright reflective spots in the image. In addition OCR processing systems rarely process spaces, however names and address always have spaces. Combinations of missing characters, extra characters, and character substitution errors would result in many falsely mismatched mailpieces. As a consequence, all of the above factors made mailpiece verification of names and/or address using OCR methods impractical.

A prior art system for guessing at the intended recipient of an unidentifiable mailpiece is disclosed in U.S. Pat. No. 6,796,433 assigned to the same assignee as the present invention. In this prior art system, the processing attempts to identify the intended recipient of rejected mailpieces by matching some identified portion of the OCR read addressee information from specific fields such as the addressee name field or the addressee location field to corresponding information in a company specific keyword database containing information relating to the fields contained in the addressee database. If the field information matches the identity of the recipient is concluded to be the recipient identified through the matched field information.

Other known prior art name and address matching systems and methods would typically only declare a match if the OCR character string matched exactly to the expected character string. The majority of failures to declare a match can be traced to space differences between characters and OCR processing errors. The known prior art matching systems and methods are not satisfactory in that the scanned character string and the expected character string had to match exactly to declare a match. The comparison process is time consuming and slows down throughput on mailpiece processing apparatus. Further, minor errors that had no consequence on the validity of the match between the scanned character string and the expected character string resulted in a rejection of the mailpiece.

To improve OCR address matching, processing results need to be more accurate and consistent. Since the fonts that are used on most mailpieces are not ideal for OCR scanning, some errors must be expected. Higher resolution cameras, better image conditions (lighting, focus, contrast, etc.), and advanced OCR algorithms running on more powerful computers would all improve the OCR scan results. However, these are not cost effective options to significantly reduce OCR processing errors.

Accordingly, it would be desirable to provide a method of verifying that an intended addressee on a mailpiece matches a valid addressee in a mail processing apparatus using an OCR system that overcomes the disadvantages of known prior art matching systems and methods, improves accuracy and speeds throughput of mailpiece processing equipment.

It would also be desirable for a user to set a confidence level to conclude that an OCR scanned intended addressee having minor errors is that of a valid addressee.

SUMMARY OF THE INVENTION

In accordance with the present invention, a significant reduction in false mismatches is achieved by accounting for combinations of unprocessed spaces, missing characters, extra characters and character substitution errors during the OCR processing and allowing for a specified percentage of the OCR character scan rather the entire OCR character scan to be the same as the expected character string to declare a match. A reduced number of false mismatches mean less time is spent in manual operator intervention to validate or remake suspect mailpieces.

In a broad aspect of the invention, a method of verifying that an intended addressee on a mailpiece matches a valid addressee in a mail processing apparatus using an OCR system is presented and includes identifying character recognition errors in an OCR character string of the intended addressee and then comparing the characters of the OCR character string to the characters of an expected character string of the intended addressee. An accuracy value for a minimum number of required character matches between the characters of the OCR character string and the characters of the expected character string of the intended addressee is assigned and a confidence level is generated that for a given accuracy value the intended addressee is that of the valid addressee. A match between the intended addressee and the valid addressee is declared when the confidence level is met or exceeded and an error is declared when the confidence level is not met.

In a further aspect of the invention, an OCR percentage matching algorithm is presented. The algorithm verifies that an intended addressee on a mailpiece matches a valid addressee in a mail processing apparatus using an OCR system by comparing an OCR character string scan of the intended addressee to an expected character string of the corresponding valid addressee. Spaces in the expected character string are removed and then each character of the scanned OCR character string is searched for in the characters of the expected character string, typically from left to right although the search could be from right to left, starting with the first character in the expected character string until that scanned OCR character is located. The search is repeated for the next subsequent character of the scanned OCR character string in the characters of the expected character string starting from the location of the last previously located character in the expected character string or if the end of the expected character string is reached without locating the previous character, repeating the search for the next subsequent character of the scanned OCR character string from the location of the second last previously located character in the expected character string. The search is repeated for each next subsequent character of the scanned OCR character string until the percentage of located OCR scanned characters in the correct order matching the correspondingly positioned characters in the expected character string exceeds a pre-determined threshold percentage. A match is declared between the intended addressee and the valid addressee upon reaching the pre-determined threshold percentage whereby further character comparison is stopped. In the event the pre-determined percentage threshold is not reached, a mis-match is declared and the intended addressee is not verified.

The invention also contemplates verifying a small expected character string, usually around six characters in which a mis-match is declared if more than one character of the OCR scanned characters does not match the characters in the expected character string.

BRIEF DESCRIPTION OF THE DRAWINGS

Additional objects, features and advantages of the present invention will become readily apparent from the written description of preferred embodiments taken in conjunction with the drawings wherein:

FIG. 2 illustrates an OCR character string scan with missing characters compared to an expected character string.

FIG. 3 shows a sequential listing in a first example of the method steps used to determine character matches between the OCR character string scan of FIG. 2 and the expected character string in accordance with the OCR percentage address matching algorithm embodying the present invention.

FIG. 4 illustrates an OCR character string scan with extra characters compared to an expected character string.

FIG. 5 shows a sequential listing in a second example of the method steps used to determine character matches between the OCR character string of FIG. 4 and the expected character string in accordance with the OCR percentage address matching algorithm embodying the present invention.

FIG. 6 illustrates an OCR character string scan with substitution and untrained characters compared to an expected character string.

FIG. 7 shows a sequential listing in a third example of the method steps used to determine character matches between the OCR character string of FIG. 6 and the expected character string in accordance with the OCR percentage address matching algorithm embodying the present invention.

FIG. 8 illustrates an OCR character string scan with substitution and extra characters compared to an expected character string.

FIG. 9 shows a sequential listing in a fourth example of the method steps used to determine character matches between the OCR character string of FIG. 8 and the expected character string in accordance with the OCR percentage address matching algorithm embodying the present invention.

WRITTEN DESCRIPTION OF THE INVENTION

Figure 1B:
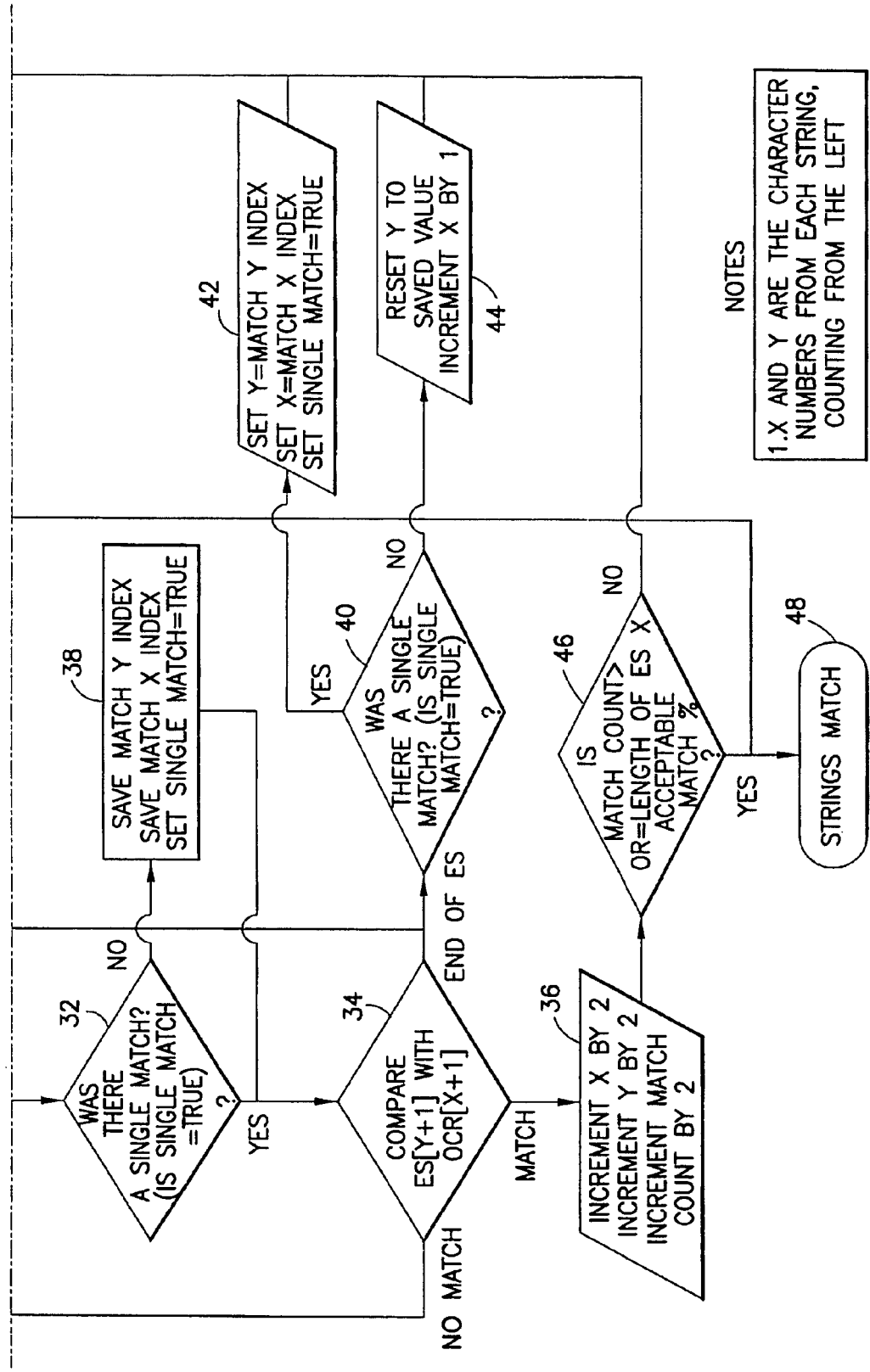
FIG. 1 is a flowchart of the OCR percentage address matching algorithm embodying the present invention.

Turning now the drawings and considering the invention in further detail, a flowchart of the OCR percentage address matching algorithm embodying the present invention is illustrated in FIG. 1. The OCR percentage address matching algorithm illustrated in FIG. 1 is described by way of several examples herein below. In order for the OCR percentage address matching algorithm to declare a match in accordance with the present invention the specified percentage of characters from the expected character string must be found in the OCR scan processing string results in the correct order and not including spaces.

The characters of the scanned OCR character string are compared to the characters from the expected character string from left to right. There is no particular technical reason to scan from left to right however since most languages are written from left to right it seems more logical to do so. If for any reason it makes sense to scan from right to left, the OCR percentage address matching algorithm embodying the invention would operate in the same manner.

The scanned characters in the OCR character string are compared to characters in the expected character string as a consequence of the definition for the matching of the strings in the algorithm. For example, if it is desired to have a 90% or greater match to the expected address, the expected character string must be used as the reference to make the determination. The user may assign an accuracy value for a minimum number of required character matches to generate a confidence level to conclude for a given accuracy value the intended addressee is the valid addressee and thus allow or accommodate inconsequential errors in the OCR character string. For example, a user may have a confidence level at which the user feels comfortable to conclude that the OCR scanned addressee recipient name is that of the valid addressee recipient name when 80% of the scanned characters match the characters in the expected character string in the correct order. The user may have a higher or lower confidence level based on the importance of the information to insure the delivery of the mailpiece or the number of characters making up the information. For example, a zip code may require a 100% match or accuracy level for the user to have a confidence level to conclude a match exists between the OCR scanned characters and the expected characters.

The OCR percentage address matching algorithm can be applied to any section or combination of sections in the address to be verified. More commonly, it is typical used to match an expected name against a scanned name. However, it can be used to match any name and address combination as well as the entire address block. The specific section or combination of sections of the address are determined by the user in accordance with the particular result desired in the verification process.

In accordance with the OCR percentage address matching algorithm of the present invention as illustrated in the flow-chart shown in FIG. 1, the spaces are first removed from the expected character string before the comparison with the OCR scan processing result is performed because the OCR scan processed result generally does not include a space since there is no character to recognize. The OCR scan processing results are not automatically declared a mismatch if the expected number of characters do not match the number of characters returned in the scan processing. Extra characters in the OCR scan processing results are anticipated to occur from time to time. As long as a sufficient number of scanned characters are in the correct order to meet the required percentage match, the extra characters do not affect the results. However, if there are extra leftover characters in the expected address when the scan processing result characters have all been processed, the leftover characters are considered mismatched and will affect the match/mismatch result of the scan. Missing characters and character substitutions in the OCR scan processing results are identified and allowed as long as there are enough remaining characters to meet the specified match percentage. A "?" is typically to identify an unprocessed character and is accommodated in the OCR percentage address matching algorithm of the present invention. If an expected character is not found in the OCR scan processing result, then this character is considered a mismatch and the processing continues with the next expected character.

Each character in the OCR scan processing result is searched for in the expected character string from left to right as stated above. If the character is found, the search is repeated for the next character starting from the location of the last located character. If the end of the expected character string is reached and the character is not found, then the search is repeated starting the second previously matched character. This searching from the location of the second previously matched character is done to identify, and account for a character substitution when the incorrect substituted character is located in the expected character string. When a sufficient number of characters in the OCR scan processing result are matched with the characters in the expected character string to equal or exceed the specified percentage set for matching, the processing is stopped and a match is declared.

Small expected character strings need to be processed and treated differently than longer character strings because a single missed character in a small or low number of character string constitutes a large percentage of the expected character string. The number of characters in the expected character string defining a small string can be specified and therefore is configurable and typically set some where in the range of six characters. In accordance with the algorithm of the inventors, a mismatch is declared for a small string if more than one mismatched character is identified regardless of the specified percentage for matching that is, for small strings only one mismatched character is allowed regardless of the percentage matching before a mismatch is declared.

Turning now to a first example of the operation of the algorithm of the present invention wherein the OCR scanned processing result is missing characters with particular reference to FIG. 2, the OCR scan result is illustrated in FIG. 2 wherein the character "E" is not processed and the expected character string includes 15 non-spaced characters. The address verification of the example shown in FIG. 2 is carried out in accordance with the OCR percentage address matching algorithm as shown in FIG. 1, and a listing of the algorithm sequence for the example is shown in FIG. 3. The algorithm starts at step 10 and the spaces are removed from the expected character string in the method step 12. The OCR scan processing results are retrieved as indicated by the method step 14. For purposes of the explanation, each character of the expected character string is identified by a (y) index number and each character of the OCR scanned processed results is identified by an (x) index number. As illustrated in the example in FIG. 3, the sequential listing of the method steps used to determine character matches between the OCR character string scan and the expected string scan demonstrates the operation of the OCR percentage address matching algorithm. In the example in FIG. 3, the number of character matches is set at 12, that is, an accuracy value of 80% of the expected character string of the address must be found in the OCR scan processing character string result of the address in the correct order to reach a confidence level that a match exists to declare that the strings match.

Turning now to a second example as illustrated in FIGS. 4 and 5, the OCR scan processing character string results include extra character wherein each space is processed as an "x". In example 2, the OCR percentage to declare the strings match is set at an accuracy value of 100% or 15 character matches to reach a confidence level that a match exists. As in example 1 above, the spaces are removed from the expected string in step 12 and the OCR scan process character string result is retrieved in step 14. In this example, it is seen that the character in the third position ES(3) of the expected character string "J" is compared with the character OCR(3) in the OCR scanned results character string in position three "X". The "X" represents a space in the scanned results and therefore does not match with the expected character "J". In this case, each subsequent character in the expected character string is compared with the space "X" character until the end of the expected character string is reached at which time the search is repeated for the next character starting from the location of the last located character.

In a third example as illustrated in FIGS. 6 and 7, the OCR scanned processing results in the OCR character string having substituted characters as illustrated in FIG. 6 in which each character "S" is processed as an "8" and the letters "O" and "A" are not trained and appear as "?" in the OCR scan results. In this example of the OCR percentage address matching algorithm a confidence level is set to declare that a match occurs upon 12 character matches of the expected character string in the correct order not including spaces, that is, an accuracy value of 80% is set to verify the address is correct. In this example, it is seen that the end of the expected character string is reached twice before the search is repeated starting from the last matched character and in this example the last matched character ES(3) and OCR(3) is the letter "J".

In a fourth example as illustrated in FIGS. 8 and 9, the OCR scan processing results include substitution and extra characters wherein the letter "E" is processed as "L2" and the letters "I" and "T" are processed as the number "1". In this example, a match is declared at an accuracy value of 66% when ten characters of the OCR scan process character string results match ten characters in the expected character string in the correct order not including spaces. In this example the confidence level is reached at a lower number of character matches. As in the previous examples, the spaces are removed from the expected character sting in step 12 and the OCR scan processing results are retrieved in step 14. In this example, it is seen that the end of the expected character string is reached three times before a match is made with the character "R" in the tenth position ES(10) of the expected character string and the character "R" in the tenth position OCR(10) of the OCR scan results.

Figure 10:
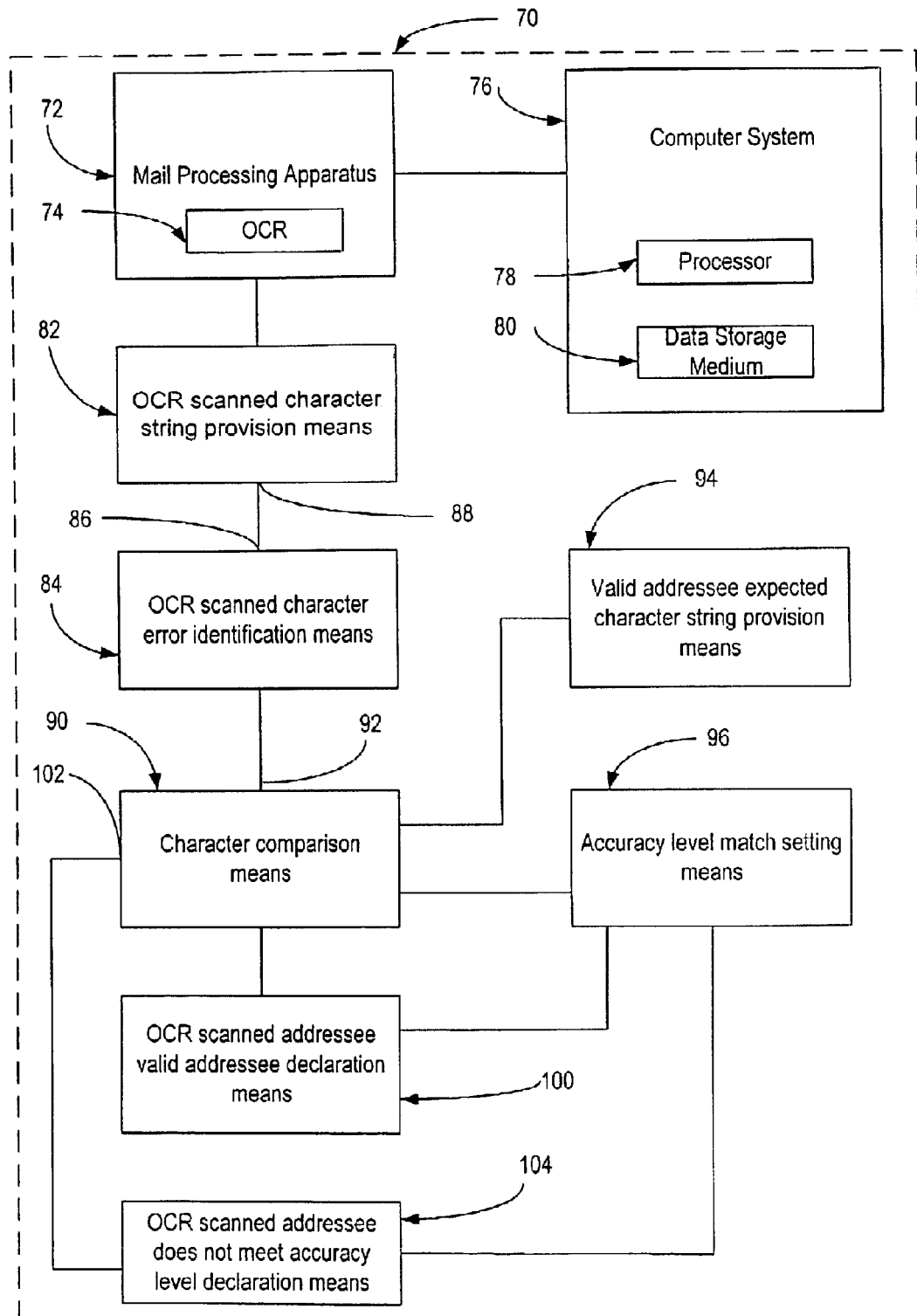
FIG. 10 is a functional block diagram of a system for carrying out the OCR percentage matching algorithm of the present invention.

Turning now to FIG. 10, a system for carrying out the OCR percentage matching algorithm of the present invention is illustrated therein as a functional block diagram and generally designated 70. The system 70 includes appropriately configured mail processing apparatus 72 having an OCR scanning system 74 for scanning mailpieces passing therethrough. A computer system generally designated 76 includes a processor 78 and suitable data storage medium such as a hard drive or other suitable memory means appropriate for carrying out the intended function of the computer system and is generally designated 80. The data storage medium 80 may store an instruction set or program code for the OCR percentage address matching algorithm and other appropriate instruction sets for carrying out the control functions of the computer system and the mail processing apparatus as well understood by those skilled in the art. The system 70 includes a means generally designated 82 for providing the OCR scanned character string. Means generally designated 84 for identifying OCR scanned character errors generally designated 84 receives the OCR scanned character string at its input 86 from the output 88 of the OCR scanned character string means 82. A character comparison means 90 receives the OCR scanned character string and identified character errors at its input 92 together with the valid addressee expected character string from a suitable provision means, such as a database, generally designated 94. The character comparison means 90 also receives a accuracy level value from an appropriately configured accuracy level match setting means 96. The output 98 of the character comparison means 90 is coupled to an OCR scanned addressee valid addressee declaration means 100 to declare a match when the number of characters of the OCR scanned character string meets the accuracy level of the valid addressee expected character string. An output 102 of the character comparison means 90 is coupled to the OCR scanned addressee does not meet the accuracy level declaration means generally designated 104 to declare an error exists when the number of characters of the OCR scanned character string does not meet the number of characters of the valid addressee expected character string as determined by the accuracy level set to declare a match.

The invention also contemplates a software system for identifying character recognition errors in the intended addressee OCR scanned character string; comparing the OCR scanned characters to an expected character string of the valid addressee; generating a confidence level based on assigned accuracy value to conclude that the intended addressee is that of the valid addressee and then declaring a match between the OCR scanned intended addressee and the valid addressee in response to the confidence level being met or exceeded.

An OCR percentage address matching algorithm for verifying that an intended addressee on a mailpiece matches a valid addressee in a mail processing apparatus using an OCR system has been presented above wherein spaces in the OCR scan processing results are not used to fail the verification and wherein OCR scan processing errors will not cause the name and/or address matches to fail the verification as long as a specified percentage of the expected character sting is successively processed in the correct order.

The invention claimed is:

1. A method of verifying that an intended addressee on a mailpiece matches a valid addressee in a mail processing apparatus using an OCR system by comparing an OCR character string scan of the intended addressee to an expected character string of the corresponding valid addressee, the method comprising the steps of:
   (a) removing spaces in the expected character string;
   (b) searching for each character of a scanned OCR character string in the characters of the expected character string from left to right starting with a first character in the expected character string until that scanned OCR character is located;
   (c) repeating the searching step for a second subsequent character of the scanned OCR character string in the characters of the expected character string starting from a location of a last previously located character in the expected character string or if an end of the expected character string is reached without locating the second subsequent character, repeating the searching step for a third subsequent character of the scanned OCR character string from the location of a most recent previously located character in the expected character string;
   (d) repeating step (c) for each next subsequent character of the scanned OCR character string until a percentage of located OCR scanned characters in a correct order matching correspondingly positioned characters in the expected character string exceeds a pre-determined threshold percentage; and
   (e) declaring a match between the intended addressee and the valid addressee upon reaching the pre-determined threshold percentage; whereby further character comparison is stopped.

2. The method as defined in claim 1 further including a step of defining the expected character string as a small character string when a number of characters in the expected character string does not exceed a pre-determined number of characters.

3. The method as defined in claim 2 wherein the number of characters defining a small string is six characters.

4. The method as defined in claim 1 further including a step of setting the pre-determined threshold percentage value.

5. The method as defined in claim 2 wherein the step of searching for each character of the scanned OCR character string further comprises searching a scanned OCR character string having missing characters.

6. The method as defined in claim 1 wherein the step of searching for each character of the scanned OCR character string further comprises searching a scanned OCR character string having extra characters.

7. The method as defined in claim 1 wherein the step of searching for each character of the scanned OCR character string further comprises searching a scanned OCR character string having substitution and untrained characters.

8. The method as defined in claim 1 wherein the step of searching for each character of the scanned OCR character string further comprises searching a scanned OCR character string having substitution and extra characters.

* * * * *